United States Patent [19]

Geel et al.

[11] 4,375,413
[45] Mar. 1, 1983

[54] RINSING DEVICE AND METHOD OF RINSING ARTIFICIAL KIDNEYS THEREWITH

[75] Inventors: Zane H. Geel, Tigard, Oreg.; John Maroney, Lafayette, Calif.

[73] Assignee: Cordis Dow Corp., Miami, Fla.

[21] Appl. No.: 275,529

[22] Filed: Jun. 19, 1981

[51] Int. Cl.³ .................. B01D 31/00; B01D 13/00
[52] U.S. Cl. .................... 210/636; 210/321.3; 210/409; 239/598
[58] Field of Search ............ 210/433.2, 409, 321.3, 210/636; 134/24; 239/598, 121

[56] References Cited

U.S. PATENT DOCUMENTS

| | | | |
|---|---|---|---|
| 232,131 | 9/1880 | Iske | 239/121 |
| 1,492,924 | 5/1924 | Knight | 134/24 X |
| 1,534,208 | 4/1925 | Gibson | 210/433.2 X |
| 1,978,721 | 10/1934 | Perkins | 239/598 X |
| 2,658,623 | 11/1953 | Thornhill | 210/409 |
| 3,373,876 | 3/1968 | Stewart | 210/409 X |
| 3,554,444 | 1/1971 | Hochman | 239/598 X |
| 4,001,110 | 1/1977 | Geen et al. | 210/321.3 X |
| 4,211,597 | 7/1980 | Lipps et al. | 210/433.2 X |

Primary Examiner—Frank A. Spear, Jr.
Attorney, Agent, or Firm—Neal A. Waldrop

[57] ABSTRACT

A rinsing nozzle device is provided. The nozzle is a small, hand-held device adapted to deliver rinsing liquid into the interior of the blood chamber of a non-disassembleable artificial kidney to flush out blood clots or the like. The device provides a liquid receiving chamber in the end portion of the device from which the nozzle projects which functions to prevent splashing of the flushing liquid during use.

A method for cleaning an artificial kidney for possible re-use is also disclosed.

11 Claims, 4 Drawing Figures

RINSING DEVICE AND METHOD OF RINSING ARTIFICIAL KIDNEYS THEREWITH

BACKGROUND OF THE INVENTION

In the past hollow fiber artificial kidneys of the type shown in U.S. Pat. Mahon No. 3,228,876 have typically been used in a single hemodialysis treatment and discarded in the interest of patient safety. Some cleaning and sterilizing of used hollow fiber artificial kidneys and reuse for subsequent treatments on the same patient has occurred in some clinics and by some home treatment patients.

For cylindrical hollow fiber artificial kidneys having end blood chambers formed by removable headers secured in place by removable screw bands the task of cleaning the blood chambers is relatively simple after disassembly. For other hollow fiber artificial kidneys having integral, non-disassembleable means forming the end blood chambers of the type shown in U.S. Pat. No. 4,231,871 and application Ser. No. 223,964 which is owned by the assignee of this application, the problem of cleaning for reuse is more difficult. This is particularly true in the event blood clots remain in the blood chamber in the area of the peripheral corner of the tubesheet and inner wall of the header, or in some of the fiber end openings in the tubesheet.

In such artificial kidneys which have substantially inaccessible blood chambers, there is a need for specially adapted means for rinsing the interior surfaces of such blood chambers. The device of this invention is particularly adapted for use in the process of cleaning such artificial kidneys for reuse.

SUMMARY OF THE INVENTION

The nozzle device of this invention comprises a cylindrical body having liquid supply attachment means on one end and a needle-like spout projecting axially outwardly from the opposite end. The spout end of the body terminates in a hollow cylindrical chamber which surrounds a portion of the inner end of the spout. The diameter and depth of the hollow chamber are selected so as to receive and surround the outer end portion of the connector on the header which defines the blood chamber at each end of the artificial kidney. In use, as the outer end of the nozzle projects into the blood chamber the blood port connector becomes positioned in the hollow chamber which overlies a portion of the end of the blood port connector such that rinsing fluid being flushed outwardly through the blood port connector is received with the chamber and deflected away from the nozzle user.

In a preferred embodiment the inner end wall of the chamber is provided with means which insures against blockage of the outwardly flowing rinse liquid in the event the outer end surface of the connector makes contact with the inner end chamber wall surface.

The method of the invention comprises the step of rinsing the inner wall surfaces of an artificial kidney blood chamber and the tubesheet face which contains the open ends of the hollow fibers while concurrently blocking ingress of rinse liquid into the lumens of the fibers, and preferably while concurrently back-flushing rinse liquid through the walls of the fibers and into the chamber being rinsed.

DETAILED DESCRIPTION OF THE PREFERRED EMBODIMENTS

Figure 1:
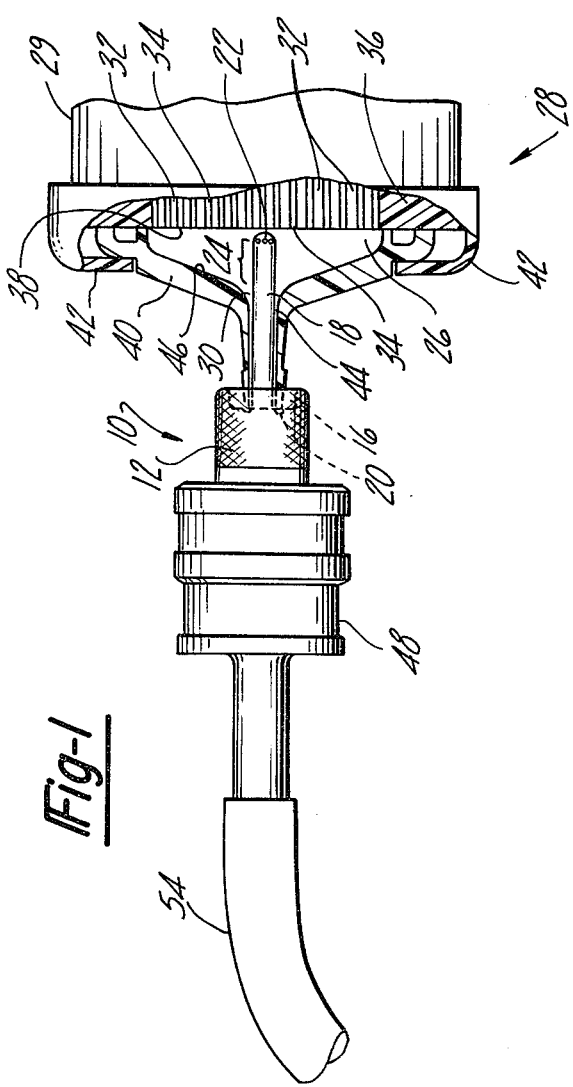
FIG. 1 is a side view showing the nozzle device of this invention in rinsing position in a cylindrical hollow fiber artificial kidney.
Figure 2:
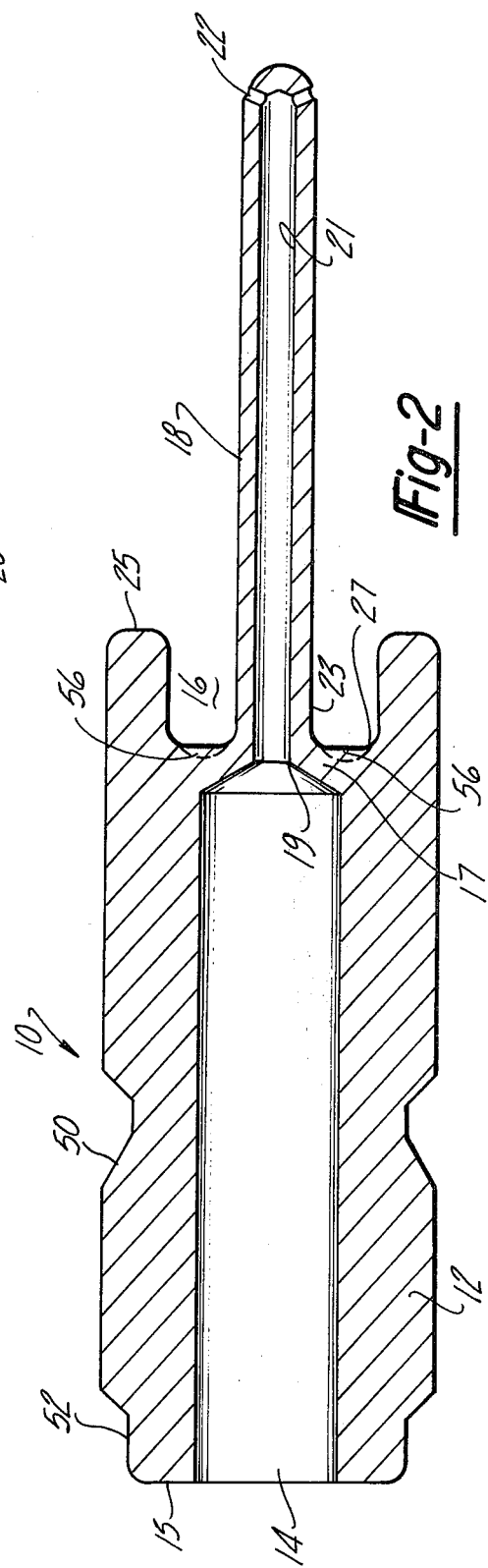
FIG. 2 is a cross sectional view through nozzle device of FIG. 1 taken through the longitudinal axis thereof.
Figure 3:
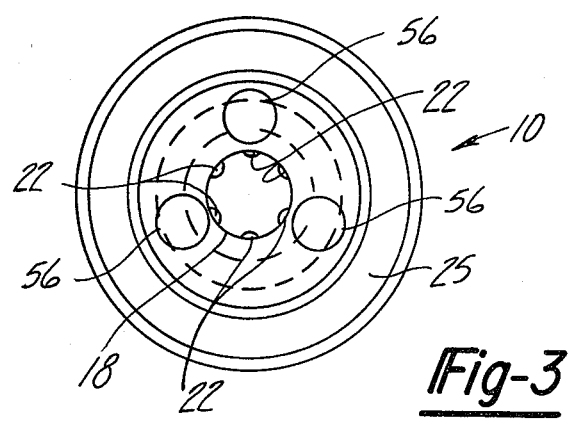
FIG. 3 is an end view of the nozzle of FIG. 2 looking in from the right hand end thereof.

As shown in FIGS. 1–3, the nozzle generally designated 10 comprises a body 12 having an axially extending channel 14 which extends from the liquid supply end 15 to spout support wall 17 where it terminates in a reduced diameter channel 19. Spout 18 extends outwardly from wall 17 along the longitudinal axis of body 12 and is provided with an axially extending liquid delivery channel 21 which communicates directly with channel 19 in support wall 17.

As best seen in FIG. 2, spout 18 is surrounded adjacent to its inner end portion 23 by chamber 16. Chamber 16 extends inwardly from delivery end 25 of body 12 to the outer wall surface 27 of wall 17. The diameter of chamber 16 is larger than the diameter of spout 18 sufficiently to accommodate and to receive the outer end of the blood port connector 20, FIG. 1, for a purpose that will be described further in connection with the use of the device.

The outer end of spout 18 is provided with one or more liquid outlet ducts 22. As shown in FIG. 2, ducts or ports 22 are arcuately spaced around the periphery and angularly diverge from a plane which passes through the longitudinal axis of spout 18 at right angles to the plane of the cross section shown in FIG. 2. The number of ducts 22, their arcuate spacing about the circumference of spout 18 and the angular relationship to the above-located plane of reference is not critical but rather a matter of design choice. For example, the outlet duct 22 may be located on the axis of spout 18, or on the periphery, as shown, and may satisfactorily vary from one duct to two or three tiers of four to eight ducts arcuately spaced and positioned at any location within the portion designated 24 which extends into blood chamber 26 when device 10 is inserted for rinsing use as shown in FIG. 1. A preferred construction is shown in FIG. 2 and the line passing through the center of each duct 22 preferably diverges from a plane passing through the longitudinal axis of spout 18 and perpendicular to the plane of FIG. 2 at angles of about 70° to about 100°.

FIG. 1 illustrates device 10 in normal position for rinsing use in a cylindrical hollow fiber artificial kidney of the non-disassembleable type shown in co-pending application Ser. No. 223,964. The kidney, generally designated 28, has a dialysate chamber 29 which contains thousands of small diameter hollow semipermeable fibers 32, of conventional cellulosic type. Fibers 32 have open ends 34, shown in enlarged illustrative form, which extend through tube-sheet 36 and terminate in the inner planar surface 38 of tubesheet 36. Blood chamber 26 is formed by generally conically shaped header 40 which overlies surface 38 of tubesheet 36 and is non-disassembleably secured thereto by suitable means such as overlying bracket members 42. The outer end of header 40 terminates in blood port connector 20, of conventional type for liquid tight connection to a blood supply tube connector (not shown).

As illustrated in FIG. 1, the outside diameter of spout 18 forms a relatively close fit with the inside diameter of connector 20 but the annular space therebetween may be varied as desired to accommodate different sizes and models of artificial kidneys. The annular space 30 does control the rate at which rinsing fluid escapes outwardly from blood chamber 26 and that rate is controlled by the rate and pressure at, and under which, the rinse fluid is injected through outlets 22 against the inner surfaces 46 of header 40.

In rinsing, use chamber 16 receives the outflowing rinse liquids flowing through annulus 30 and carrying entrained debris, blood clots, and the like and prevents splashing and deflects those liquids away from the nozzle user.

As shown in FIG. 1, connector 20 extends into chamber 16 so that the outer end surface of connector 20 is in direct engagement with the outer wall surface 27 of spout support wall 17. It will be appreciated that rinse liquid cannot continue to exit through annulus 30 into chamber 16 when the user inserts spout 18 into blood chamber 26 to the depth there shown and forcibly maintains that position. The preferred form of chamber 16, shown in FIG. 3, prevents such usually unintentional but undesirable blockage of flow of rinse fluid even when wall 27 forcibly bears against the outer end of connector 20, shown in dotted line position. Outer wall surface 27 is provided with indentation means 56, or recessed areas, spaced 120° apart and located so that at least a portion of the opening in connector 20 overlies a portion of the indented or recessed surface 56. Other means for preventing blocking contact of the end of connector 20 with wall 27 may be used including, for example, raised, interrupted circular beads which project outwardly from surface 27, as viewed in FIG. 2, or outwardly projecting hemispherical protrusions, or the like as will be readily apparent to one skilled in the art.

Figure 4:
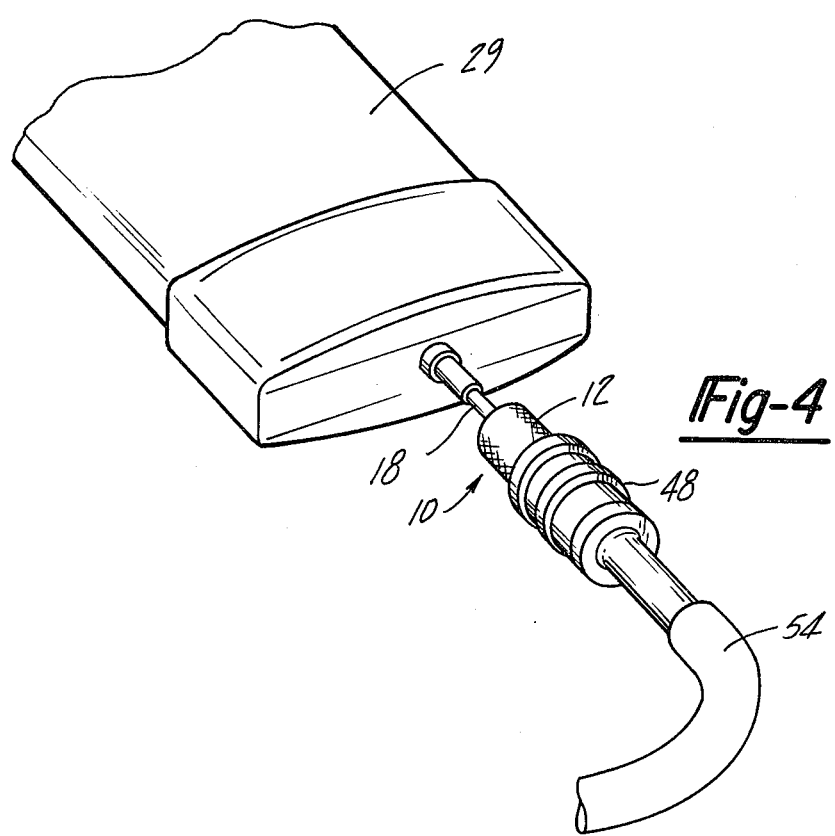
FIG. 4 is a view illustrating the nozzle assembly of FIG. 1 in assembled position for use in rinsing an artificial kidney of the type shown in U.S. Pat. No. 4,231,871.

FIG. 4 illustrates the nozzle of this invention in inserted rinse position in an artificial kidney having a cross sectional shape other than round and of the general type shown in U.S. Pat. No. 4,231,871.

The method of this invention comprises the steps of inserting the spout of the nozzle device of this invention through the blood port and into the interior of the blood chamber of a non-disassembleable hollow fiber artificial kidney of the type shown in FIGS. 1 and 4 and spraying rinse liquid from the ducts in the spout against the inner surfaces of the chamber and the planar face of the tubesheet for a time and under sufficient force to dislodge blood clots and other debris therefrom and to flush same from the chamber outwardly through the blood port.

Prior to beginning the spray rinsing through spout 18, the open ends of the hollow fibers which terminate in the planar end surface of tubesheet 36 should be blocked against the ingress of rinse liquids from chamber 26 and into the fibers, since it is undesirable to cause debris or clots to move into the lumens of the fibers. Blockage may be accomplished by various satisfactory procedures, including applying a thin coating of hot wax by spraying against the planar surface 38 until all of the open ends are blocked, or by filling the fiber lumens with a fluid such as saline or water, that is maintained under pressure sufficient to resist any forcible impingement pressure which occurs during the spray rinsing step. Such fluid pressure may be induced by forcing the saline or water through the fiber lumens from the end of the kidney opposite to the end being rinsed.

It is preferred to block the fiber ends in the blood chamber being cleaned by supplying rinse liquid into the dialysate chamber under pressure to thereby effect flow through the semipermeable walls of each fiber, and through its lumen into the blood chambers and to continue this reverse flushing during the spray rinsing of the inner surfaces of the chamber walls. In this process, the blood port on the end opposite the end being rinsed will be blocked and all of the reverse flush liquid will flow into the blood chamber at the tubesheet planar face.

In order to insure forceful impingement of the rinse stream from ducts 22 against the inner walls 46 and tube-sheet face 38 during rinsing it is desirable to perform rinsing into the chamber while the artificial kidney is horizontally oriented, as shown. Any angular orientation is satisfactory as long as the rinse stream can forcibly impinge against the portion of the inner wall surface of the chamber being cleaned. The best procedure is to hold the artificial kidney in one hand in a horizontal orientation and to slowly rotate the kidney during rinsing. In using the nozzle device of this invention, as illustrated in FIG. 1, a source of rinse liquid is attached to the supply end of the nozzle device 10 as generally indicated by the connector 48 having internal protrusions which lock into attachment slots 50 and 52 on the outer end surface portions of body 12. The rinse fluid, which may be sterile saline solution, sterile water or other liquid such as tap water, is supplied to connector 48 through tubing 54 under pressure and with volume control means on tube 54, not shown. With nozzle 10 attached to supply tube 54, the user merely inserts spout 18 through the opening in the blood connector 20 to an extent such that the inner end ports 22 on spout 18 are within blood chamber 26. The flow of rinse fluid under pressure is commenced and by a series of inward and outward oscillations of spout 18 into and out of blood chamber 26, the rinsing liquid is directed, as needed, against the entire inner surface 46 of header 40 and against the planar surface 38 of tubesheet 36. The rinsing procedure is continued until all of the debris and/or blood clots located on any of the surfaces within blood chamber 26 have been dislodged and flushed outwardly in the rinsing liquid which exists through the annular space 30 into the chamber 16 and thence to drain. When rinsing commercial artificial kidneys of the type illustrated in FIGS. 1 and 4, a visual inspection of clerarance of blood clots and debris is usually possible because the material used in fabricating header 40 is either transparent or translucent. Difficult to dislodge clots or debris can be removed by varying pressure or rate of flow of rinse fluid, or both, and in certain circumstances it has been desirable to spray the rinse liquid in pulsating bursts.

We claim:

1. A method for rinsing a blood chamber of an artificial kidney having a dialysate chamber separated by a tubesheet from the blood chamber and also having a plurality of hollow semipermeable fibers extending through the dialysate chamber and tubesheet, the ends of the fibers opening into the blood chamber at a planar face of the tubesheet defining an inner surface of the blood chamber, comprising the steps of
   (a) blocking the ingress of rinse liquid into the open ends of said fibers at said planar face,
   (b) inserting into said blood chamber means for forcibly spraying rinsing liquid on the inner wall surfaces which define said chamber and on the planar face of said tubesheet, and
   (c) spraying rinse liquid from said means on said chamber walls and said tubesheet planar face for a time and under sufficient force to dislodge debris and blood clots from said surfaces and to flush same from said chamber.

2. A method in accordance with claim 1, wherein said sprayed liquid is applied in pulsating bursts.

3. A method in accordance with claim 1, wherein said blocking is effected by reverse flushing of a liquid under pressure into said dialysate chamber on the outside of said fibers and through the walls thereof into said blood chamber while said spraying of rinse liquid occurs.

4. A method in accordance with claim 1 wherein said blocking comprises a process selected from the following:
   (a) the process of coating said planar surface with a hot wax to close the open ends of said fibers, and
   (b) the process of supplying said rinsing liquid under pressure into said dialysate chamber at the exterior of said fibers to effect flow of said liquid through the semipermeable walls of said fibers and their open ends into the blood chamber.

5. A rinsing device adapted for use in rinsing the blood chamber of an artificial kidney having a tubular blood port, said device comprising a body having a liquid supply end and a delivery end, a liquid supply channel in said body having supply and delivery openings at said supply and delivery ends respectively for receiving and discharging rinse liquid, said delivery end comprising spout support wall means having said delivery opening extending therethrough, means for injecting rinse liquid into a blood chamber comprising a spout extending outwardly from said support wall means and adapted for insertion freely through the blood port to adjacent the inner portion of the blood chamber, a channel extending lengthwise in said spout and having inner and outer ends, said inner end communicating with said delivery opening, said outer end comprising liquid outlet means adjacent to the outer end of said spout, and means for deflecting rinse liquid flushed from the blood chamber and along said spout toward said support wall means in the space between the spout and tubular blood port during a rinse operation when said spout is inserted through the blood port into the blood chamber comprising a chamber in said spout support wall means, the latter chamber comprising a channel extending around said spout and opening in the outward direction of extension of said spout from said support wall means for redirecting said flushed rinse fluid outwardly from said support wall means, said channel having a channel base and radially inner and outer channel walls, said base comprising the outer surface of said support wall means, said radially inner wall comprising the exterior of said spout adjacent to said support wall means, and said radially outer wall comprising an outward extension of said support wall means.

6. A device according to claim 5, said channel extending annularly and coaxially around said spout and comprising means for freely receiving the end of a tubular blood port therein when said spout is inserted through said port during a rinsing operation.

7. A device according to claim 6, said channel base comprising means for preventing fluid sealing contact between said base and the end of a tubular blood port received within said channel when said spout is inserted through said port during a rinsing operation.

8. A device according to claim 7, said means for preventing fluid sealing contact comprising multiple irregularities in the surface of said channel base.

9. In combination with an artificial kidney having a plurality of hollow fibers extending axially through a tubesheet having a planar end face defining an axially inner surface of a blood chamber, said kidney having header means cooperable with said tubesheet for enclosing said blood chamber and having a tubular blood port extending in the axial direction from said planar surface; rinsing means for rinsing said blood chamber comprising a body having a liquid supply end and a delivery end, a liquid supply channel in said body having supply and delivery openings at said supply and delivery ends respectively for receiving and discharging rinse liquid, said delivery end comprising spout support wall means having said delivery opening extending therethrough, means for injecting rinse liquid into said blood chamber comprising a spout extending from said support wall means and being freely insertable through the blood port to adjacent said planar end surface, a channel in said spout and having inner and outer ends, said inner end communicating with said delivery opening, said outer end comprising liquid outlet means adjacent to the outer end of said spout, and means for deflecting rinse liquid flushed from said blood chamber and along said spout toward said support wall means in the space between said spout and tubular blood port during a rinse operation when said spout is inserted through said blood port into said blood chamber comprising a chamber in said spout support wall means, the latter chamber comprising a channel extending around said spout and opening in the direction of extension of said spout from said support wall means for redirecting said flushed rinse fluid outwardly from said support wall means.

10. Rinsing means according to claim 9, said channel extending annularly and coaxially around said spout and having a channel base and radially inner and outer channel walls, said base comprising the outer surface of said support wall means, said radially inner wall comprising the exterior of said spout adjacent to said support wall means, said radially outer wall comprising an outward extension of said support wall means, and said radially inner and outer walls being spaced radially for freely receiving the extending end of said tubular blood port therein when said spout is inserted into said blood chamber through said port during a rinsing operation.

11. Rinsing means according to claim 9, said channel base comprising means for preventing fluid sealing contact between said base and the extending end of said tubular blood port when the latter is received within said channel during a rinsing operation.

* * * * *